United States Patent
Hasegawa

(10) Patent No.: US 8,304,005 B2
(45) Date of Patent: Nov. 6, 2012

(54) METHOD FOR PRODUCTION OF DEFATTED SOYMILK PEPTIDE

(75) Inventor: Yoshinori Hasegawa, Izumisano (JP)

(73) Assignee: Fuji Oil Company, Limited, Osaka (JP)

( * ) Notice: Subject to any disclaimer, the term of this patent is extended or adjusted under 35 U.S.C. 154(b) by 0 days.

(21) Appl. No.: 12/988,684

(22) PCT Filed: Apr. 16, 2009

(86) PCT No.: PCT/JP2009/057648
§ 371 (c)(1), (2), (4) Date: Nov. 24, 2010

(87) PCT Pub. No.: WO2009/131052
PCT Pub. Date: Oct. 29, 2009

(65) Prior Publication Data
US 2011/0059212 A1    Mar. 10, 2011

(30) Foreign Application Priority Data
Apr. 21, 2008 (JP) .................................. 2008-109914

(51) Int. Cl.
*A23C 9/14* (2006.01)
(52) U.S. Cl. ........................................ 426/271; 426/656
(58) Field of Classification Search ................... 426/271
See application file for complete search history.

(56) References Cited

U.S. PATENT DOCUMENTS

| | | | |
|---|---|---|---|
| 6,268,487 B1 * | 7/2001 | Kutzko et al. ................ | 530/414 |
| 6,465,432 B1 * | 10/2002 | Han et al. ...................... | 514/5.5 |
| 7,332,192 B2 * | 2/2008 | Cho et al. ...................... | 426/656 |
| 2006/0057275 A1 | 3/2006 | Wu et al. | |
| 2006/0134310 A1 | 6/2006 | Cho et al. | |
| 2008/0096243 A1 | 4/2008 | Cho et al. | |

FOREIGN PATENT DOCUMENTS

| | | | |
|---|---|---|---|
| EP | 0797927 | * | 1/1997 |
| JP | 7-227215 | | 8/1995 |
| JP | 2750467 | | 2/1998 |
| JP | 2750467 | | 5/1998 |
| JP | 3470441 | | 9/2003 |
| WO | 2006/034172 | | 3/2006 |
| WO | WO/2006/034172 | * | 3/2006 |
| WO | 2006/066170 | | 6/2006 |
| WO | 2007/066694 | | 6/2007 |

OTHER PUBLICATIONS

Zhao: The American Society for Nutritional Sciences J. Nutr. 135:2379-2382, Oct. 2005.*
International Search Report issued Jul. 21, 2009 in International (PCT) Application No. PCT/JP2009/057648.
Chinese Office Action (with English translation) issued May 15, 2012 in corresponding Chinese Application No. 200980114208.3.

* cited by examiner

*Primary Examiner* — Humera Sheikh
*Assistant Examiner* — Patricia George
(74) *Attorney, Agent, or Firm* — Wenderoth, Lind & Ponack, L.L.P.

(57) ABSTRACT

Disclosed is a method for improving the filtering properties of a defatted soymilk peptide. Also disclosed is a defatted soymilk peptide having improved filtering properties. The filtering properties of a defatted soymilk peptide can be improved by adding a calcium salt to the defatted soymilk peptide in an amount of 0.6 wt % or more in terms of calcium content relative to the crude protein content. The resulting mixture is filtered once or more times to produce a defatted soymilk peptide having improved filtering properties. The defatted soymilk peptide is characterized by containing a calcium salt in an amount of 0.4 wt % or more in terms of calcium content relative to the crude protein content.

16 Claims, 1 Drawing Sheet

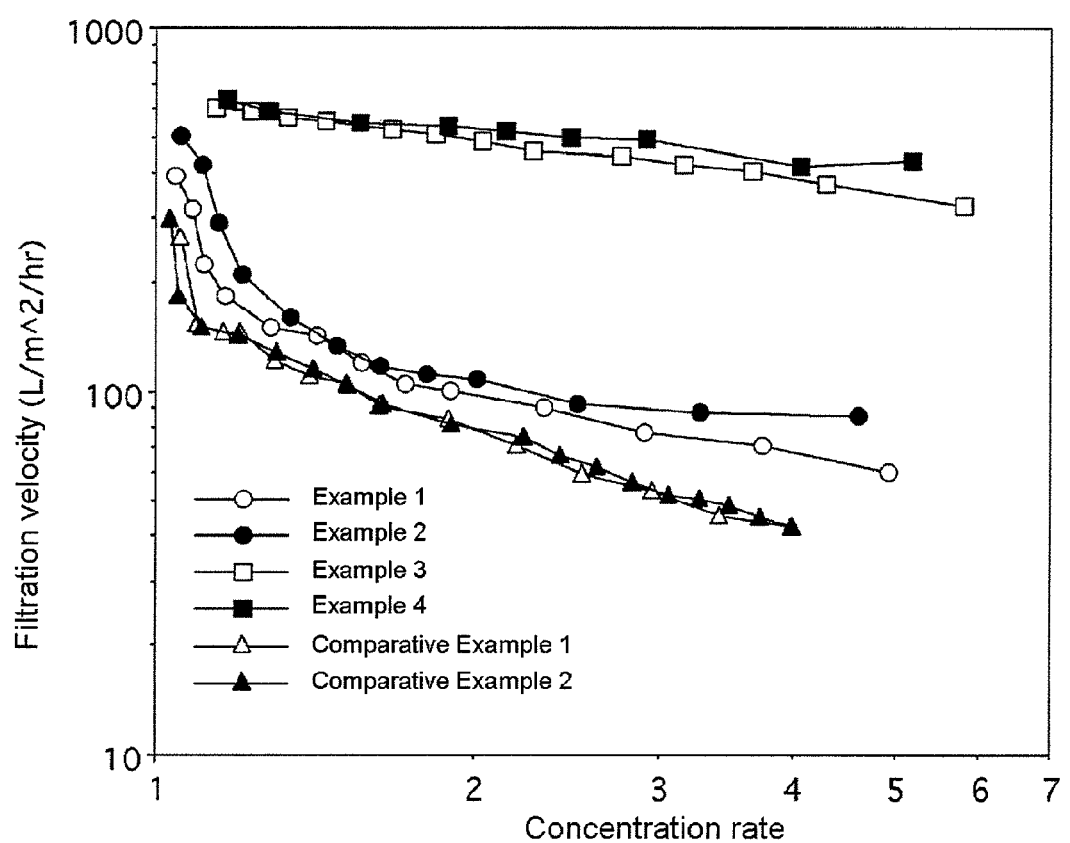

METHOD FOR PRODUCTION OF DEFATTED SOYMILK PEPTIDE

TECHNICAL FIELD

The present invention relates to a method for producing a defatted soymilk peptide. More specifically, the present invention relates to a method for producing a defatted soymilk peptide with improved productivity.

BACKGROUND ART

Peptide is prepared by hydrolysis of protein with acid or enzyme treatment, and it is known to show excellent digestion and absorption properties when ingested orally. Peptide is used in dietary supplements and sports drinks as low-allergic nitrogen sources. Recently, a peptide has been attracting attention as functional materials, since it has been verified to have beneficial effects, such as alleviating muscle fatigue, reducing blood cholesterol levels, lowering blood pressure, and stimulating microbial fermentation.

High degree of clarity is one of the quality requirements for developing the commercial availability of peptide in dietary supplements, including liquid food, sports drinks, and culture media markets. Low clarity causes reduction in marketability as food and difficulty in isolating useful components from medium.

A variety of raw material proteins for preparing peptide have been developed, including animal proteins contained in egg white, milk, fish meat and the like; plant proteins contained in soybean, wheat and the like; and microbial proteins. Among them, for example, peptide prepared using soy protein as raw material has been developed, including SPI peptide prepared from soy protein isolate as raw material, defatted soymilk peptide prepared from soymilk, which is derived from defatted soybean, as a raw material, and soymilk peptide prepared from soymilk, which is derived from whole fat soybean, as a raw material. While soymilk peptide is poor in nitrogen content as compared with SPI peptide, it contains soy oligosaccharides and minerals in a balanced manner. In particular, soymilk peptide is widely developed in the medium market and in dietary supplements.

During the process of producing peptide from a variety of soy protein, insoluble matter, which is thought to be a polymerization product of decomposed peptide, is known to be generated. Therefore, in general practice, such insoluble matter is removed by filtration, such as diatomite filtration, microfiltration and ultrafiltration, in the preparation of high clarity peptide. However, defatted soymilk peptide, in particular, has very poor filtering properties as compared with SPI peptide, and it causes an increase in production costs. Therefore, improvement of the properties has been longed.

Meanwhile, calcium is known as a highly reactive divalent cation, and various applications as a flocculant have been proposed. By way of an example of application of calcium to peptide, Patent Document 1 proposes a method for eliminating phytic acid by adding calcium to SPI peptide prepared using a soy protein isolate (SPI) as a raw material. However, in Patent Document 1, calcium is used for the purpose of reducing the formation of residues from phytic acid, and it makes no particular mention of the influence of calcium on the filtering properties of SPI peptide.

Patent Document 2 describes calcium content in relation to defatted soymilk peptides. However, the description relates to the determination of endogenous calcium levels in soymilk, and no idea of improving the filtering properties of defatted soymilk peptide by artificially adding calcium is found in Patent Document 2.

PRIOR ART REFERENCES

Patent Document 1: JP 2750467 B
Patent Document 2: JP 3470441 B

DISCLOSURE OF THE INVENTION

Problems to be Solved by the Invention

The present invention has been accomplished in view of the current state of the art described above. More specifically, objectives of the present invention are to provide a method for improving the filtering properties of a defatted soymilk peptide and to provide a defatted soymilk peptide having improved filtering properties.

Means for Solving the Problems

The present inventors have made intensive studies to address the problems with the conventional techniques, as a result, the inventors have found that the filtering properties of defatted soymilk peptide are improved by adding a large amount of calcium and have completed the present invention based on this finding.

That is, the present invention provides: (1) a method for producing a defatted soymilk peptide which comprises, adding a calcium salt to a defatted soymilk peptide in an amount of 0.6 wt % or more in terms of calcium content relative to the crude protein content, and filtering the resulting mixture once or more times; and (2) a defatted soymilk peptide comprising a calcium salt in an amount of 0.4 wt % or more in terms of calcium content relative to the crude protein content.

Effects of the Invention

The present invention allows an improvement of the filtering properties of defatted soymilk peptide. Furthermore, due to the improved productivity of defatted soymilk peptide and the reduction in production costs, inexpensive and clear defatted soymilk peptide can be provided to the markets.

BRIEF DESCRIPTION OF DRAWINGS

FIG. 1 shows a graph of filtration velocity of defatted soymilk peptides with addition of different amounts of calcium.

BEST MODE FOR CARRYING OUT THE INVENTION (Defatted Soymilk)

As used herein, the term "defatted soymilk" refers to an extract of defatted soybean with removal of insoluble fractions such as okara (bean curd refuse), and a re-dissolved solution of a dried matter thereof, without elimination of low-molecular-weight fractions by means of isoelectric precipitation, ultrafiltration or the like. In such defatted soymilk, in general, the concentration of crude protein in the solid fraction is 40 wt % to 75 wt %. An exceedingly low concentration of crude protein reduces the value of defatted soymilk peptide as a nitrogen source.

(Defatted Soymilk Peptide)

Defatted soymilk peptide can be obtained by hydrolyzing the protein components contained in the defatted soymilk using acid or proteolytic enzyme (protease). The concentration of the solid fraction in the solution of defatted soymilk for hydrolysis of the soymilk protein is preferably 1 to 30 wt %, and more preferably 5 to 15 wt %. Although the hydrolysis is not adversely affected by a low concentration of defatted soymilk, it will cause reduction in the productivity and increase of costs for the production of defatted soymilk peptide. On the other hand, when the concentration of defatted soymilk is exceedingly high, the hydrolysis rate tends to become difficult to increase.

As the method for the hydrolysis, it is preferred to use protease as it is safe and is able to hydrolyze under milder condition. When the hydrolysis is performed with a protease, the protease used can be a commercially available protease, such as protease of animal, plant and microbial origin. Specifically, serine proteases (including animal-derived trypsin and chemotrypsin, and microbe-derived subtilisin and carboxypeptidase), thiol proteases (including plant-derived papain and bromelain), and carboxyl proteases (including animal-derived pepsin) can be used. More specifically, examples of the protease include Pancreatin (manufactured by Amano Enzyme Inc.) and PTN (manufactured by Novozymes), which are animal origin; Papain W-40 and Bromelain F (both manufactured by Amano Enzyme Inc.), which are plant origin; and alcalase (manufactured by Novozymes A/S), Sumizyme LP (manufactured by Shinnihon Chemicals Co., Ltd.), Thermoase (manufactured by Daiwa Kasei Co., Ltd.) and Protease N (manufactured by Amano Enzyme Inc.), which are microbial origin. These proteases can be used either alone or in combination. When proteases are used in combination, they can be added simultaneously or sequentially.

The reaction pH and temperature for the protease hydrolysis can be appropriately selected within the pH and temperature ranges that allow protease activity. However, if the hydrolysis temperature is excessively low, it takes a longer time to achieve the desired proteolysis rate. On the other hand, if the hydrolysis temperature is excessively high, problems such as inactivation of the protease, coloring of defatted soymilk peptide, and generating an off flavor may arise.

The reaction time for protease hydrolysis is preferably about 5 minutes to 24 hours, and more preferably about 30 minutes to 9 hours, although it depends on the activity and amount of the protease used. If the hydrolysis time is excessively long, there are increased risks of decomposition of the materials.

The extent of hydrolysis (hydrolysis rate) with the protease is expressed as a percentage of the soluble 15 wt % trichloroacetic acid (TCA) fraction in the crude protein, and is generally referred to as "15% TCA solubility." The protease hydrolysis is preferably performed up to 25% to 100%, and more preferably up to 50% to 90%, as assessed by 15% TCA solubility of the defatted soymilk peptide reaction solution. In this process, the crude protein can be measured using any known method. In general, for soy protein, it is calculated by multiplying the nitrogen content measured by the Kjeldahl method by 6.25 as the protein factor.

(Calcium Salt)

A calcium salt used in the present invention is preferably readily-soluble calcium salt, including inorganic calcium salt such as calcium chloride and calcium hydroxide, and organic calcium salt such as calcium gluconate and calcium lactate. The calcium salt can be either chemically synthesized or naturally occurring. These calcium salts can be used either alone or in combination. The amount of the salt to be added is determined considering the desired quality and the costs. The amount is 0.6 wt % or more, preferably 1.2 wt % or more and more preferably 2.0 wt % or more in terms of calcium content relative to the protein content of the defatted soymilk. A sufficient upper limit of the amount to be added is 10 wt % or less in terms of calcium content relative to the protein content of the defatted soymilk. If the amount of calcium salt to be added is excessively small, the effect of improving the filtering properties cannot be sufficiently achieved, whereas addition of an excessively large amount of calcium salt will lead to deterioration of the flavor.

The timing of the addition of calcium salt can be either before or after the protease hydrolysis, and addition after the protease hydrolysis is preferred. If calcium salt is added before the protease hydrolysis, with large amount, the substrate soy protein forms aggregates, which may hamper the achievement of the desired proteolysis rate. If calcium salt is added after the protease hydrolysis, the addition can be carried out after the condensation and concentration of the defatted soymilk peptides obtained by protease reaction.

(Filtration Methods)

The present invention is characterized in that the insoluble matter is filtered off after the addition of calcium in order to obtain defatted soymilk peptide with high clarity. There is no particular limitation on the kind of filtration, and conventional filter press, diatomite filtration, microfiltration, ultrafiltration and the like can be used. Prior to the filtration, the insoluble matter can be roughly-removed by any means such as centrifugation. The filtering properties can further be improved by roughly-removing insoluble matter.

In general, the solution to be filtered flows in a vertical direction to the filtration membrane in diatomite filtration and the like. On the other hand, microfiltration, ultrafiltration and the like often employ a cross-flow system, in which the solution to be filtered flows in a horizontal direction to the filtration membrane. In such a system, the solution to be filtered circulates within the circulation line provided with a filtration membrane, and the filtrate is removed from the system gradually in a sequential manner. Therefore, the impurity concentration in the circulating solution tends to increase with time. This rate of concentration is referred to as a "concentration rate", and is calculated as "the amount of the solution to be filtered/(the amount of the solution to be filtered−the amount of the filtrate)." An appropriate concentration rate can be selected. If necessary, residual calcium can be removed by any means such as electrodialysis or ion-exchange resin after the filtration.

(Inactivation of Enzyme)

In general, it is necessary to inactivate the enzyme in a product treated with the enzyme, and inactivation of the protease is required in the present invention. Inactivation of the protease is generally performed by heat treatment, and such treatment can be selected for the present invention. With respect to the timing of the heat treatment, any time after the achievement of the desired proteolysis rate can be selected. However, considering that heat treatment in the presence of insoluble matter generated by the protease hydrolysis would readily lead to formation of residues in the final product, heat treatment after the removal of the insoluble matter is preferable. In general, the heating condition is at about 85° C. to 145° C. for 5 seconds to 30 minutes. Under the condition, sterilization of the peptide solution can be carried out simultaneously in some cases.

After the inactivation of the protease and the sterilization, defatted soymilk peptide can be commercially available, either directly or after being concentrated. They can also be commercially available as powder after drying.

(Physical Properties of Defatted Soymilk Peptide)

The 15% TCA solubility of the defatted soymilk peptide obtained as described above is 40% to 100%, preferably 70% to 99%. If no particular desalting treatment, such as electrodialysis, is carried out, the defatted soymilk peptide contains 0.4 wt % or more of residual calcium relative to the crude protein content. The amount of the residual calcium is preferably 0.6 wt % or more, and more preferably 1.0 wt % or more. The upper limit of the amount of the residual calcium is preferably 8 wt % or less relative to the crude protein content. Flavor deterioration will result from the amount of excessively high content of residual calcium.

EXAMPLES

The present invention is described in detail below with reference to examples. In the following examples, the term "%" and "part" always refers to by weight.

Comparative Example 1

The first soymilk extract was obtained by adding 10 volumes of water to defatted soybean and by stirring and extraction, followed by separating okara. The second soymilk extract was obtained by adding 10 volumes of water to the separated okara, and by stirring and extraction, followed by separating okara. The first and second soymilk extracts were mixed and then freeze-dried to obtain defatted soymilk powder. The crude protein concentration of the defatted soymilk powder was 62.0 wt %. The defatted soymilk powder was dissolved in water to prepare 9 wt % solution and the pH was adjusted to 7.0. To the solution, protease (Protease N; manufactured by Amano Enzyme Inc.) was added in an amount of 2 wt % relative to the crude protein content in the defatted soymilk. The mixture was subjected to hydrolysis at 55° C. for 5 hours to obtain a reaction solution of defatted soymilk peptide. The supernatant obtained by centrifuging the reaction solution at 5,000 rpm for 5 minutes was heated at 85° C. for 30 minutes to inactivate the enzyme. Thus, a defatted soymilk peptide solution was obtained.

Comparative Example 2

To the defatted soymilk peptide reaction solution obtained in the same manner as in Comparative Example 1, calcium chloride was added in an amount of 0.4 wt % in terms of calcium content relative to the crude protein content in the reaction solution of defatted soymilk peptide. The supernatant obtained by centrifuging this solution at 5,000 rpm for 5 minutes was heated at 85° C. for 30 minutes to inactivate the enzyme. Thus, a defatted soymilk peptide solution was obtained.

Examples 1 to 4

A defatted soymilk peptide was obtained by performing the same procedure as described in Comparative Example 2, except that, as shown in Table 1, calcium chloride was added in an amount of 0.9 wt % to 3 wt % in terms of calcium content relative to the crude protein content in the reaction solution of defatted soymilk peptide.

Experimental Example 1

In the circulation line provide with a microfiltration module (USP-143; manufactured by Asahi Kasei Corporation), 20 L of each of the defatted soymilk peptide solution obtained in Comparative Examples 1 and 2 and Examples 1 to 4 was circulated to verify the correlation between the concentration rate and the filtration velocity when the solution was filtered at a filtration pressure of 0.04 MPa. Furthermore, the filtrate thus obtained was freeze-dried and then used to determine the crude protein content and the 15% TCA solubility by the Kjeldahl method, and the residual calcium content relative to the crude protein by fluorescent X-ray analysis.

The results of Experimental Example 1 to verify the correlation between the concentration rate and filtration velocity are shown in FIG. 1. The filtration velocity when the solution was concentrated to 4 times, the crude protein content, the 15% TCA solubility, and the residual calcium content are summarized in Table 1.

TABLE 1

Filtration velocity of calcium-added defatted soymilk peptide

| | Comparative Example 1 | Comparative Example 2 | Example 1 | Example 2 | Example 3 | Example 4 |
|---|---|---|---|---|---|---|
| Amount of Ca-chloride added (wt %) | 0.0 | 0.4 | 0.9 | 1.5 | 2.4 | 3.0 |
| Filtration velocity at 4-times concentration (L/m$^2$/hr) | 42 | 42 | 69 | 86 | 388 | 416 |
| Residual Ca content (wt %)* | 0.13 | 0.21 | 0.42 | 0.73 | 1.44 | 1.68 |
| Crude protein content (wt %) | 60.3 | 60.6 | 60.9 | 60.0 | 59.2 | 58.5 |
| 15% TCA solubility (wt %) | 98.4 | 97.6 | 97.2 | 98.6 | 97.4 | 98.1 |

*wt % in terms of Ca content relative to the crude protein content

As shown in FIG. 1 and Table 1, it was verified that the filtration velocity of the defatted soymilk peptide was significantly improved when the amount of calcium added was 0.9 wt % or more and further improved when the amount was 2.4 wt % or more. The residual calcium content in the filtered defatted soymilk peptide solution was 0.42 wt % relative to the crude protein when calcium was added in an amount of 0.9 wt %, and was 1.44 wt % when calcium was added in an amount of 2.4 wt %.

Examples 5 to 7

A defatted soymilk peptide was obtained by performing the same procedure as described in Comparative Example 2, except that, instead of calcium chloride, calcium hydroxide (Example 5), calcium lactate (Example 6) and calcium gluconate (Example 7) were added in an amount of 2.4 wt % in terms of calcium content relative to the crude protein content in the reaction solution of defatted soymilk peptides.

Experimental Example 2

For the defatted soymilk peptide solutions obtained in Examples 5 to 7, the filtration velocity was determined and the filtrates obtained were analyzed as described in Experimental Example 1. These results are shown in Table 2, as well as the results obtained in Experimental Example 1 for Comparative Example 1 and Example 3 for comparison.

TABLE 2

Filtration velocity of defatted soymilk peptides with addition of different calcium salts

| | Comparative Example 1 | Example 3 | Example 5 | Example 6 | Example 7 |
|---|---|---|---|---|---|
| Ca salt | — | Ca-chloride | Ca-hydroxide | Ca-lactate | Ca-gluconate |
| Amount of Ca added (wt %)* | 0.0 | 2.4 | 2.4 | 2.4 | 2.4 |
| Filtration velocity at 4-times concentration ($L/m^2/hr$) | 42 | 388 | 125 | 335 | 368 |
| Residual Ca content (wt %)* | 0.13 | 1.44 | 0.89 | 1.49 | 1.43 |
| Crude protein content (wt %) | 60.3 | 59.2 | 62.9 | 59.2 | 55.1 |
| 15% TCA solubility (wt %) | 98.4 | 97.4 | 98.2 | 97.7 | 96.7 |

*wt % in terms of Ca content relative to the crude protein content

From the results shown in Table 2, it was verified that like the use of calcium chloride, the use of calcium hydroxide, calcium lactate or calcium gluconate improves the filtration velocity of defatted soymilk peptide.

The invention claimed is:

1. A method for producing a defatted soymilk peptide which comprises:
    subjecting a defatted soymilk to a hydrolysis;
    adding a calcium salt to the defatted soymilk after the hydrolysis in an amount of 0.6 wt % or more and 10 wt % or less in terms of calcium content relative to crude protein content;
    filtering the resulting mixture which is obtained by carrying out the above two steps one or more times; and
    recovering the resulting filtrate as the defatted soymilk peptide.

2. A defatted soymilk peptide composition comprising a defatted soymilk peptide and a calcium salt in an amount of 0.4 wt % or more and 8 wt % or less in terms of calcium content relative to crude protein content, wherein the crude protein content in a solid fraction of the defatted soymilk peptide is 40 wt % to 75 wt %.

3. A method for improving filtering properties of a defatted soymilk peptide which comprises:
    subjecting a defatted soymilk to a hydrolysis;
    adding a calcium salt to the defatted soymilk after the hydrolysis in an amount of 0.6 wt % or more and 10 wt % or less in terms of calcium content relative to crude protein content;
    and thereby, the filtering properties of the defatted soymilk peptide which is obtained by carrying out the above two steps is improved compared to a defatted soymilk peptide in which calcium salt is not added.

4. The method for producing a defatted soymilk peptide according to claim 1, wherein 15% TCA solubility of the defatted soymilk peptide is 40% to 100%.

5. The method for producing a defatted soymilk peptide according to claim 4, wherein the filtering is carried out by using a cross-flow system.

6. The method for producing a defatted soymilk peptide according to claim 5, wherein the calcium salt is readily-soluble calcium salt.

7. The method for producing a defatted soymilk peptide according to claim 6, wherein the amount of the calcium salt is 1.2 wt % or more.

8. The method for producing a defatted soymilk peptide according to claim 6, wherein the amount of the calcium salt is 2.0 wt % or more.

9. The defatted soymilk peptide composition according to claim 2, wherein 15% TCA solubility of the defatted soymilk peptide is 40% to 100%.

10. The defatted soymilk peptide composition according to claim 9, wherein the amount of the calcium salt is 0.6 wt % or more.

11. The defatted soymilk peptide composition according to claim 9, wherein the amount of the calcium salt is 1.0 wt % or more.

12. The method for improving filtering properties of a defatted soymilk peptide according to claim 3, wherein 15% TCA solubility of the defatted soymilk peptide is 40% to 100%.

13. The method for improving filtering properties of a defatted soymilk peptide according to claim 12, wherein filtering is carried out by using a cross-flow system.

14. The method for improving filtering properties of a defatted soymilk peptide according to claim 13, wherein the calcium salt is readily-soluble calcium salt.

15. The method for producing a defatted soymilk peptide according to claim 14, wherein the amount of the calcium salt is 1.2 wt % or more.

16. The method for producing a defatted soymilk peptide according to claim 14, wherein the amount of the calcium salt is 2.0 wt % or more.

* * * * *